United States Patent [19]

Jennings

[11] 4,442,662
[45] Apr. 17, 1984

[54] METHOD AND APPARATUS FOR CONVERTING A HARVESTING MACHINE BETWEEN OPERATING AND TRANSPORT POSITIONS

[75] Inventor: Richard E. Jennings, New Holland, Pa.

[73] Assignee: Sperry Corporation, New Holland, Pa.

[21] Appl. No.: 431,521

[22] Filed: Sep. 30, 1982

[51] Int. Cl.³ .......................................... A01B 73/00
[52] U.S. Cl. .................................... 56/228; 172/625; 280/415 R
[58] Field of Search .................. 56/228, 208, 192; 280/415 R, 43.23, 415 B; 172/625, 240, 241, 248

[56] References Cited

U.S. PATENT DOCUMENTS

| 2,069,958 | 2/1937 | Diemer Kool | 172/241 |
|---|---|---|---|
| 3,142,144 | 7/1969 | Ronning | 56/228 |
| 3,207,229 | 9/1965 | Nelson | 172/241 |
| 3,751,891 | 8/1973 | Molzahn et al. | 56/228 |

FOREIGN PATENT DOCUMENTS 2053073  4/1980  Fed. Rep. of Germany ....... 56/13.6

Primary Examiner—Gene Mancene
Assistant Examiner—John G. Weiss
Attorney, Agent, or Firm—Larry W. Miller; Frank A. Seemar; Darrell F. Marquette

[57] ABSTRACT

A crop harvesting machine convertable between a longitudinally movable operating position and a laterally movable transport position is disclosed wherein the frame of the crop harvesting machine is pivotally rotated about a pivot axis carried by the draft member such that the header becomes positioned in a generally vertical alignment while a wheel assembly mounted on top of the frame during the harvesting operation is rotated into engagement with the ground. When the tongue is swung around into a laterally extending position and one of the operating wheels is turned 90 degrees to a laterally oriented position, the crop harvesting machine can be transported in a laterally extending direction. A cam operated selector valve diverts the flow of fluid through the hydraulic circuit from the header lift cylinder to a hydraulic cylinder used to rotate the frame about the pivot axis when the tongue is moved to a preselected actuating position. A method for converting a crop harvesting machine from a normal operating position to a lateral transport position is also disclosed.

20 Claims, 5 Drawing Figures

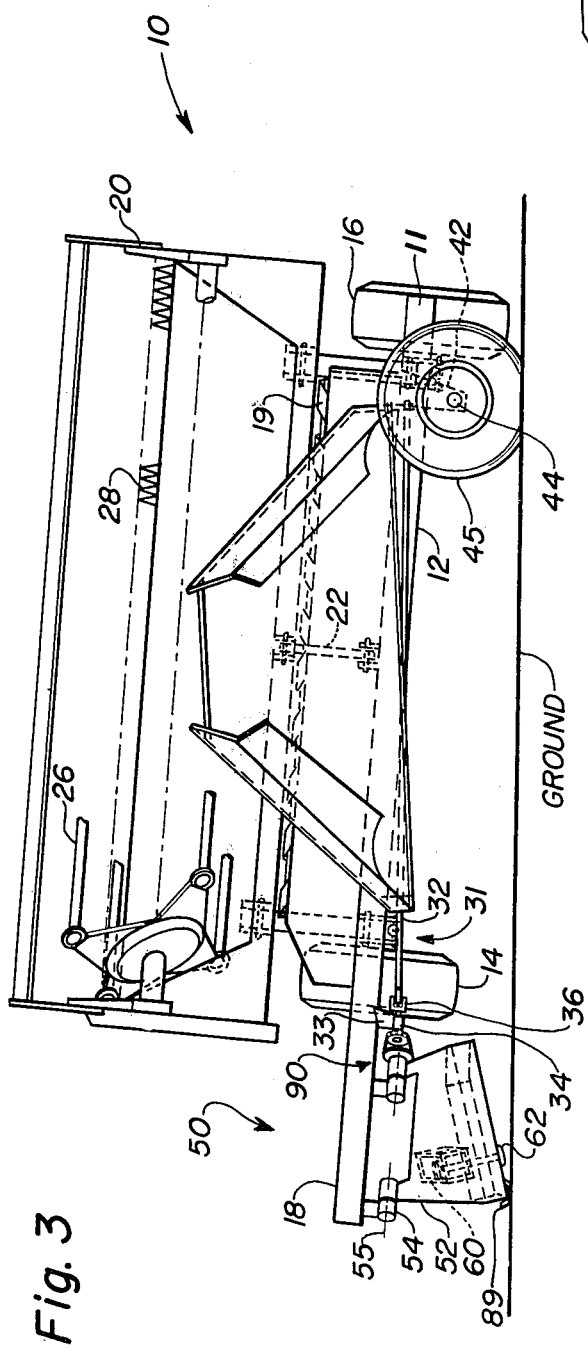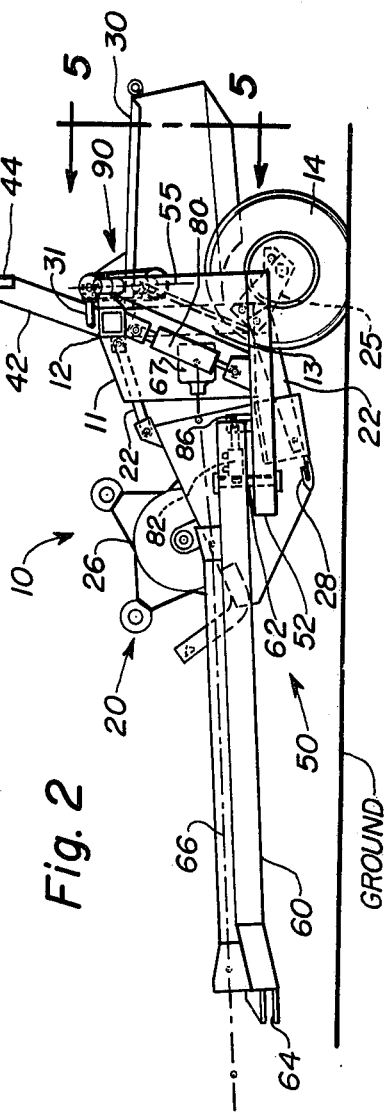
Fig. 3
Fig. 2

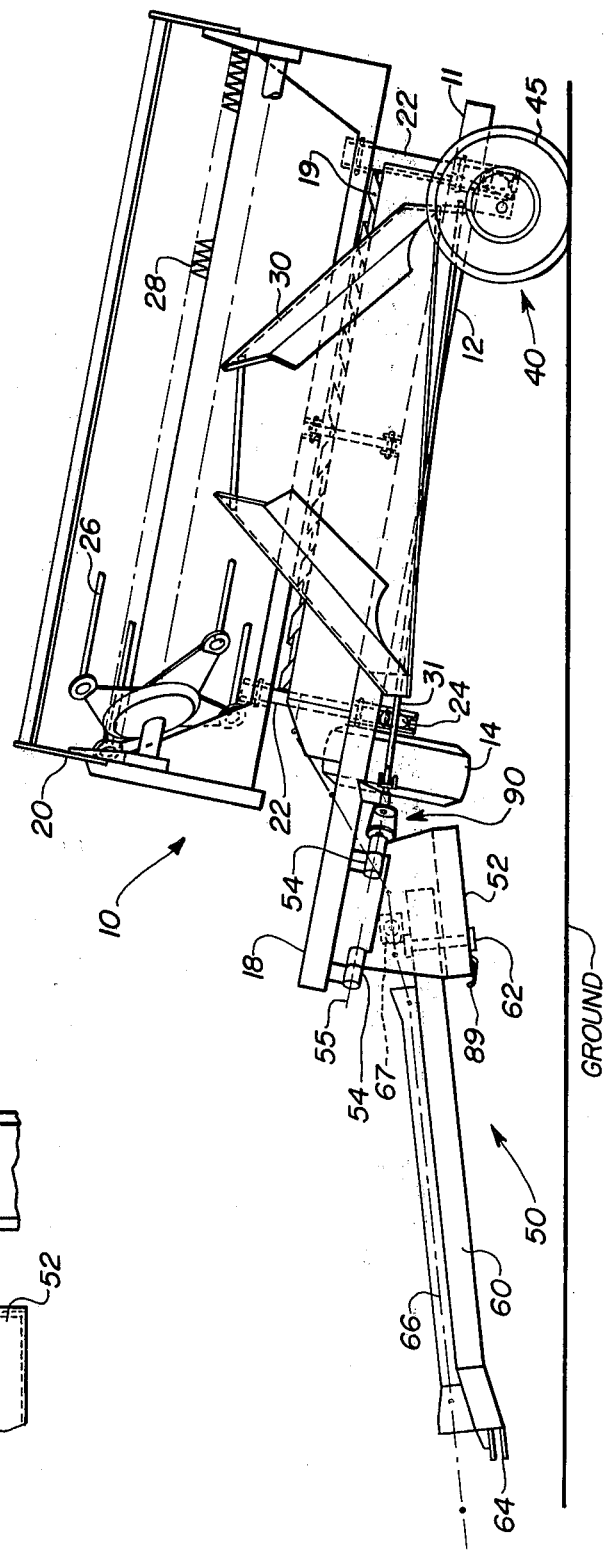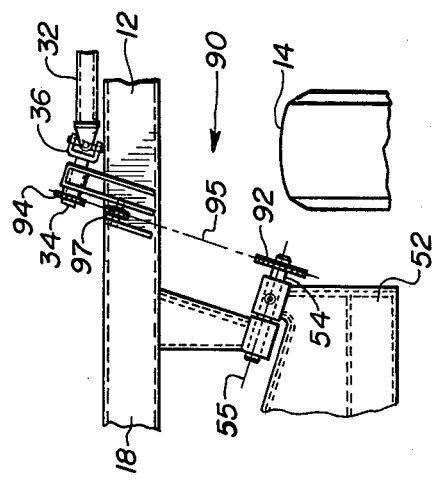

METHOD AND APPARATUS FOR CONVERTING A HARVESTING MACHINE BETWEEN OPERATING AND TRANSPORT POSITIONS

BACKGROUND OF THE INVENTION

The present invention relates generally to crop harvesting machines and, more particularly, to a method and apparatus for converting a large hay harvesting machine from a normal operating mode to a lateral transport mode so that the transport width is smaller than the operating width.

Generally, pull-type hay harvesting machines are being built with increased cutting widths. One of the problems attendant with the provision of large harvesting machines is the transportation of them through narrow openings, such as farm gates, and on public roads. One method for converting a hay harvesting machine to a lateral transport mode can be found in U.S. Pat. No. 3,962,853, granted on June 15, 1976. Since this method of converting an implement frame into a lateral transport mode involves the moving of wheels and draft tongues, a more convenient mechanism for converting the harvester into a lateral transport mode would be desirable. Furthermore, it would also be desirable to provide a method and apparatus for converting a crop harvesting machine into a lateral transport mode would be desirable. Furthermore, it would also be desirable to provide a method and apparatus for converting a crop harvesting machine into a lateral transport mode that can be implemented without the operator having to leave the comfort of his tractor cab.

SUMMARY OF THE INVENTION

It is an object of this invention to overcome the aforementioned disadvantages of the prior art by providing a method and apparatus for converting a hay harvesting machine between a longitudinally movable operating position and a laterally movable transport position.

It is another object of this invention to provide a method and apparatus for converting a harvesting machine between a longitudinal operating position and a lateral transport position that can be implemented without the operator leaving the tractor.

It is another object of this invention to utilize the hydraulic power to convert a crop harvesting machine into a lateral transport mode.

It is still another object of this invention to provide a mechanism for rotating the frame of a crop harvesting machine approximately 90 degrees until the header is generally vertically oriented in a transport position.

It is an advantage of this invention that the width of the crop harvesting machine in the transport width is substantially smaller than the width of the crop harvesting machine in the operating position.

It is another advantage of this invention that the transport width of laterally transported machines is reduced by rotating the header into a vertically aligned position prior to transporting.

It is a feature of this invention that the hydraulic cylinder for rotatably pivoting the frame of the crop harvesting machine about a pivot axis is operable from the same hydraulic circuit as the header lift cylinders.

It is still another object of this invention to provide a cam actuated selector valve to direct the flow of fluid to either the hydraulic cylinder for rotating the frame or the header lift cylinders.

It is another feature of this invention that the cam actuated selector valve is operable to divert fluid to the hydraulic cylinder used to pivotally rotate the frame of the crop harvesting machine when the tongue has been moved to a predetermined actuation position.

It is yet another object of this invention to provide a transport wheel mechanism permanently affixed to the frame of the crop harvesting machine in such a manner that the rotation of the machine frame to narrow the transport width by rotating the header in a vertical position also moves the transport wheel into a ground engaging position.

It is a further object of this invention that the windrow shields can be pivotally mounted on the harvesting machine frame so that they can be moved into a vertically inclined transport position to further narrow the transport width of the harvesting machine.

It is still another feature of this invention that one of the normal operating wheels can be pivotally moved into a laterally extending position opposite the transport wheel to provide a mechanism for mobilely supporting the crop harvesting machine in its lateral transport mode.

It is still a further object of this invention that the center of gravity of the harvesting machine in the transport mode is kept relatively low to provide stability during the transport mode.

It is yet a further object of this invention to provide a method and apparatus for converting a crop harvesting machine between a longitudinal movable operating position and a laterally movable transport position which is durable of construction, inexpensive of manufacture, carefree of maintenance, facile in assemblage and simple and effective in use.

These and other objects, features and advantages are accomplished according to the instant invention by providing a crop harvesting machine convertable to a laterally movable transport mode wherein the frame of a crop harvesting machine is pivotally rotated about a pivot axis carried by the draft member such that the header becomes positioned in a generally vertical alignment while a wheel assembly mounted on top of the frame during the harvesting operation is rotated into engagement with the ground. When the tongue is swung around into a laterally extending position and one of the operating wheels is turned 90 degrees to a laterally oriented position, the crop harvesting machine can be transported in a laterally extending direction. A cam operated selector valve diverts the flow of fluid through the hydraulic circuit from the header lift cylinder to a hydraulic cylinder used to rotate the frame about the pivot axis when the tongue is moved to a preselected actuating position. A method for converting a crop harvesting machine from a normal operating position to a lateral transport position is also provided.

BRIEF DESCRIPTION OF THE DRAWINGS

The advantages of this invention will become apparent upon a consideration of the following detailed disclosure of the invention, especially when taken in conjunction with the accompanying drawings wherein:

FIG. 2 is a side elevational view of the crop harvesting machine seen in FIG. 1 in the operating mode;

FIG. 3 is a rear view of the crop harvesting machine seen in FIG. 1 at a position intermediate the operating and lateral transport positions, the frame, header, and windrow shields having been pivotally moved into a vertically extending transport position, while the one normal operating wheel has not yet been rotated into a laterally oriented transport position;

FIG. 4 is a rear elevational view of the crop harvesting machine seen in FIG. 1 fully in the lateral transport position, with the tongue being swung into a laterally extending position; and FIG. 5 is an enlarged detailed view taken along lines 5—5 of FIG. 2 to show the rear view of the mechanism for pivoting the windrow shields into a vertically extending transport position.

DETAILED DESCRIPTION OF THE PREFERRED EMBODIMENT

Figure 1:
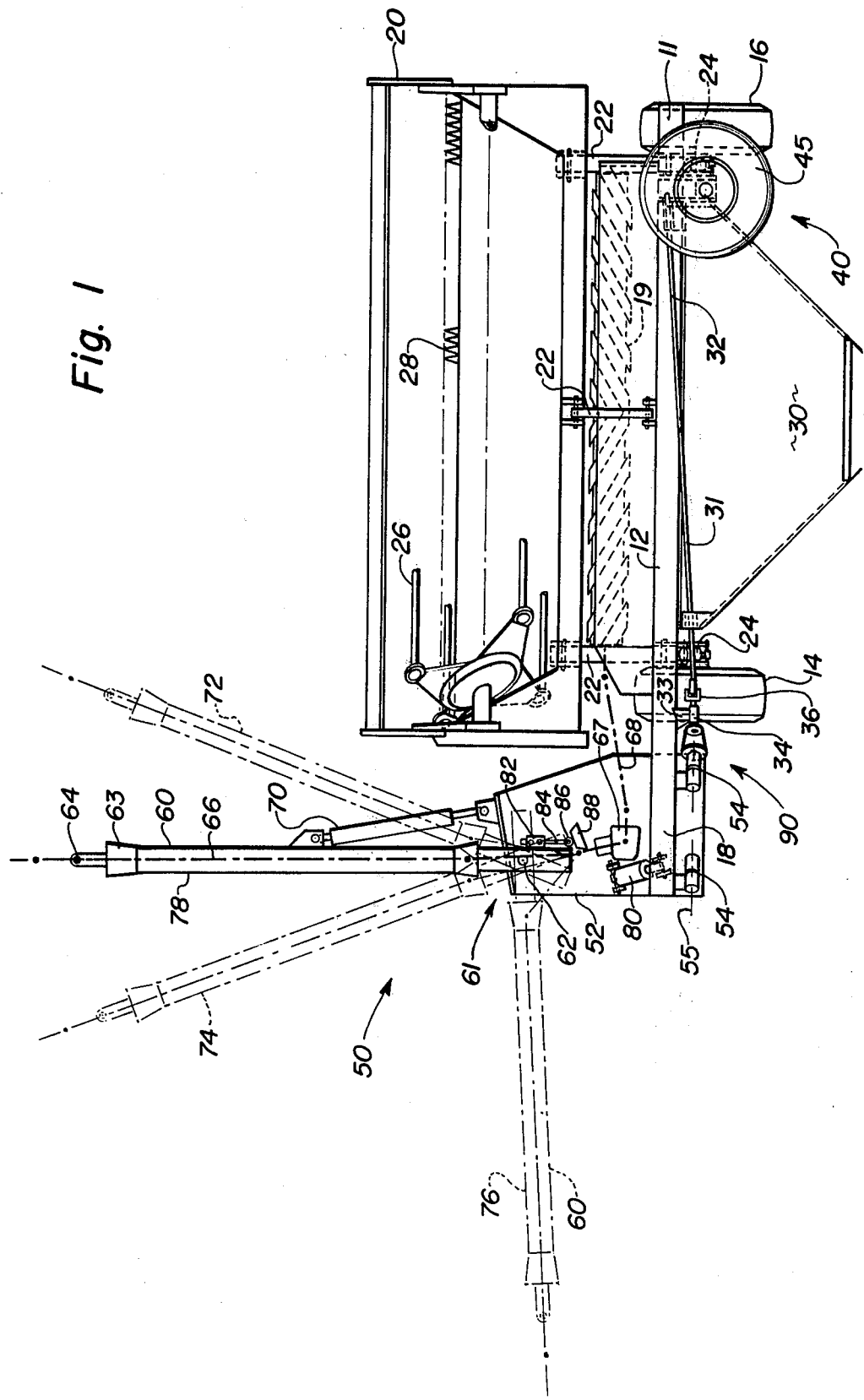
FIG. 1 is a top plan view of a crop harvesting machine, commonly referred to as a mower-conditioner, incorporating the principles of the instant invention, the machine being shown in the operating mode with the pivotal movement of the tongue being shown in phantom.

Referring now to the drawings and, particularly, to FIG. 1, a top plan view of a crop harvesting machine, commonly referred to as a mower-conditioner, can be seen. The crop harvesting machine 10 includes a frame 11 having an upper elongated beam 12 and downwardly depending legs 13 to which wheel arms 25 are pivotally connected for rotatably mounting left and right ground engaging operating wheels 14 and 16. The upper beam 12 also includes an upper beam extension 18 which projects leftwardly beyond the left wheel 14. A pair of conditioning rolls 19 are rotatably mounted in the frame 11 to condition severed crop material fed thereto.

A header 20 is mounted forwardly of the frame 11 by a set of header lift links 22 to floatingly support the header 20 through a conventional spring flotation system, not shown. A pair of header lift cylinders 24 interconnecting the wheel arms 25 and the downwardly depending legs 13 permit a lifting of the frame 11 and the header 20 relative to the ground, as is well known in the art. The header 20 includes a reel 26 mounted above a normally generally horizontally extending cutterbar 28 which severs standing crop material to be fed rearwardly into the conditioning rolls 19 by the reel 26 in a conventional manner.

A windrow forming shield 30 is affixed to a generally transverse shaft assembly 31 rotatably mounted by brackets 33 affixed to the upper beam 12 of the frame 11. The shaft assembly 31 includes a main shaft member 32 disposed in an askewed position relative to the upper beam 12 and a stub shaft 34 which is connected to the main shaft member 32 by universal joint 36 because of the misalignment between the main shaft 32 and the stub shaft for reasons that are further detailed below.

Referring now to FIGS. 1 and 2, a transport wheel assembly 40 is best seen. The wheel assembly 40 includes an upwardly extending tower post 42 affixed to the upper beam 12 of the frame 11. A spindle 44 is connected to the tower post 42 to rotatably mount a transport wheel 45 which, in the operating position as seen in FIGS. 1 and 2, is disposed in a generally horizontal orientation above the upper beam 12.

The draft mechanism 50 includes a hitch base member 52 and an elongated tongue 60. The hitch base member 52 is pivotally connected to the upper beam extension 18 by a pair of pivot pins 54 defining a pivot axis 55 that is inclined downwardly to the right. The tongue 60 is pivotally connected at one end to the hitch base member 52 by a generally vertical pivot 62. The tongue is adapted at the opposing end 63 with a hitching mechanism 64 for connection to a prime mover, such as a tractor (not shown). Rotational power is provided by a conventional power takeoff drive line schematically indicated by the broken line 66 into a 90 degree gearbox 67 having an output driveline indicated by the broken line 68 to the conditioner rolls 19. The drives to the reel 26 and cutterbar 28 have been omitted for reasons of clarity, but are conventional and well known in the art.

A hydraulic cylinder 70, connected to a hydraulic circuit separate from the hydraulic circuit operatively powering the header lift cylinders 24, interconnects the tongue 60 and the hitch base member 52 to operably power a pivotal movement of the tongue 60 relative to the hitch base member 52. Selective manipulation of the length of the hydraulic cylinder 70 is operable to pivotally move the tongue 60 from a field transport position 72 to a field operating position 74 and to a laterally extending transport position 76, all of which are shown in phantom in FIG. 1. As is seen in solid lines in FIG. 1, a preselected actuated position 78 for the tongue 60 is intermediate of the field transport position 72 and the field operating position 74.

As is seen in both FIGS. 1 and 2, a second hydraulic cylinder 80 interconnects the base hitch member 52 and the upper beam extension 18 of the frame 11. The second hydraulic cylinder 80 is operable to pivotally rotate the frame 11 about the pivotal axis 55 defined by the pivot pins 54 carried by the hitch base member 52. The second hydraulic cylinder 80 is operably powered by the same hydraulic circuit as the header lift cylinders 24. Included in this hydraulic circuit is a cam actuated selector valve 82 having a shiftable spool 84 operable to divert the fluid in this hydraulic circuit to either the header lift cylinders 24 or the second hydraulic cylinder 80.

The valve spool 84 is spring loaded into a position that diverts the fluid to the header lift cylinders 24; however, when the tongue 60 is positioned in the intermediate actuation position 78, a roller 86 affixed to the valve spool 84 engages a cam 88 to overcome the spring force and move the valve spool 84 into a second position that diverts the fluid in the hydraulic circuit from the header lift cylinders 24 into the second hydraulic cylinder 80. It should be realized by one skilled in the art that the provision of the selector valve 82 permits the instant invention to be utilized with a tractor having dual hydraulic circuits.

Referring now to FIGS. 1, 2, 3 and 4, the operation of the apparatus for converting the crop harvesting machine 10 from a harvesting mode to a lateral transport mode can be seen. Once the tongue 60 has been positioned in the intermediate actuation position 78, thereby activating the cam controlled selector valve 82 to divert the flow of fluid in the corresponding hydraulic circuit to the second hydraulic cylinder 80, the crop harvesting machine 10 can be converted into its lateral transport position.

An extension of the length of the hydraulic cylinder 80 affects a pivotal movement of the frame 11 about the pivot axis 55. As a result, the header 20, which rotatably moves along with the frame 11, is rotated from the generally horizontally extending position seen in FIGS. 1 and 2 to the generally vertical extending position seen in FIGS. 3 and 4. The rotation of the frame 11 about the pivot axis 55 by approximately 90 degrees also affects a rotation of the transport wheel assembly 40 from the upwardly extending position seen in FIG. 2 to the ground engaging position seen in FIG. 3.

Because the pivot axis 55 is inclined to a horizontal plane passing through the hitch base member 52, the left wheel 14 becomes elevated above the ground while the right wheel 16 remains engaged with the ground until the transport wheel 45 moves into its ground engaging position. Since the connection with the prime mover (not shown) at the hitching mechanism 64 is generally flexible, the hitch base member 52 ultimately contacts the ground, with the skid plate 89 actually engaging the ground surface, as the left wheel 14 is elevated.

An extension of the second hydraulic cylinder 80 beyond that necessary to rotate the frame 11 to move the transport wheel 45 into a ground engaging position causes the right wheel 16 to also lift off the ground. The right wheel 16 is pivotally connected so that it is movable from a longitudinal oriented position, as seen in FIG. 3, to a laterally oriented position, as seen in FIG. 4. The elevating of the right wheel 16 off the ground facilitates this pivotal movement of the wheel 16. A slight shortening of the length of the second hydraulic cylinder 80 will reengage the right wheel 16 with the ground surface to assist the transport wheel 45 in mobilely supporting the crop harvesting machine 19 while in the lateral transport mode. Although not shown in the drawings, one skilled in the art will readily realize that power means, such as another hydraulic cylinder or an electric motor, can be provided to automatically pivot the wheel 16 into its transport position.

Referring now to FIGS. 1-5, with particular emphasis on FIG. 5, the mechanism for pivotally moving the windrow forming shield 30 can be seen. It should be noted that provision for pivotally moving the windrow forming shield 30 must be made or the shield 30 will impact the ground when the frame 11 is pivotally rotated about the pivot axis 55. The automatic pivoting mechanism 90 includes a first sprocket 92 affixed to one of the pivot pins 54 so as to be stationary during the pivotal movement of the frame 11 about the pivot axis 55. A second sprocket 94 is affixed to the stub shaft 34 to be rotatable therewith. To keep the first and second sprockets 92,94 in the same plane, the stub shaft 34 is mounted parallel to the pivot axis 55. An endless flexible chain 95 is entrained around both the first and second sprockets 92,94.

Since the first sprocket 92 is coaxially mounted with the pivot axis 55, the second sprocket 94 orbits about the first sprocket 92 as the frame 11 pivotally moves about the pivot axis 55. Since the first sprocket 92 is stationarily fixed and cannot rotate, the chain 95 walks around the first sprocket 92 as the second sprocket 94 orbits thereabout. As a result, the second sprocket 94 will rotate, thereby rotating the shaft assembly 31, as the second sprocket 94 orbits about the first sprocket 92, causing the windrow forming shield 30 to pivotally move relative to the frame 11 opposite to the rotation of the frame 11 about the pivot axis 55. As can be best seen in FIG. 4, the shaft member 32 is askewed relative to the beam 12 and the stub shaft 34 to assure sufficient clearance of the windrow forming shield 30 when fully in the transport position.

By providing a second sprocket 94 that is half the size of the first sprocket 92, the second sprocket 94 will rotate twice as fast as the sprocket 94 is orbited about the first sprocket 92. Under this configuration, the windrow forming shield 30 will be pivotally moved approximately 180 degrees relative to the frame 11 during 90 degrees of rotation of the frame 11 about the pivot axis 55, resulting in the windrow forming shields rotating oppositely of the frame 11 and being positioned in a generally vertically oriented position substantially parallel to the vertically extending position of the header 20. One skilled in the art will readily realize that equivalent components can be substituted for the first and second sprockets 92,94 and the chain 95, such as pulleys or a reel takeup mechanism utilizing a flexible cable. In addition, an idler sprocket 97 can be provided for engagement with the chain 95 to takeup any excess slack therein.

Once the second hydraulic cylinder 80 has been extended to the proper length to cause the header 20 and the windrow forming shields 30 to be moved into a generally vertically extending position and to cause the transport wheel 45 to engage the ground surface and after the right wheel 16 has been moved into a laterally oriented position, the first hydraulic cylinder 70 can be actuated to effect a pivotal movement of the tongue 60 to the laterally extending transport position 76, as seen in FIGS. 1 and 4. It should be noted that, once the tongue 60 has moved from the intermediate actuation position 78, the roller 86 will disengage from the cam 88 and the spring loaded valve spool 84 will return to the first position in which the flow of fluid is diverted from the second hydraulic cylinder 80 to the hydraulic life cylinders 24, thereby locking the second hydraulic cylinder 80 into the selected lengthened position. Obviously, additional mechanical lockouts can be provided to assure that the second hydraulic cylinder remains in the selected position.

During the pivotal movement of the tongue 60 into its laterally extending transport position 76 from the intermediate actuation position 78, the hitch base member 52 becomes elevated from the ground to the position seen in FIG. 4. The elevation of the hitch base member 52 off the ground results by the pivotal movement of the tongue 60 about the vertical pivot 62 results because the height of the hitch mechanism, which is connected to the prime mover, and the height of the rear transport wheels 45,16 remains constant while the distance between them increases.

It should be noted that when the machine 10 is in the lateral transport position with the header 20 and the windrow forming shield 30 tilted upwardly, the heavy components of the machine 10, such as the upper beam 12 and the conditioning rolls 19, are located relatively closely to the ground, resulting in a relatively low center of gravity, which provides for a stable transport of the machine 10. The parts of the machine 10 extended upwardly into the air, such as sheet metal shielding and the reel 26, are relatively light in comparison.

It will be readily realized by one skilled in the art that the principles of the instant invention as described above in the preferred embodiment may be utilized in other agricultural machines without departing from the scope of the invention. It will be understood that various changes in the details, material, steps and arrangements of parts which have been described and illustrated to explain the nature of the invention, will occur and may be made by those skilled in the art upon a reading of the disclosure within the principles and scope of the invention. The foregoing description illustrates preferred embodiments of the invention. However, concepts, as based upon such a description, may be employed in other embodiments without departing from the scope of the invention. Accordingly, the following claims are intended to protect the invention broadly, as well as in the specific form shown herein.

Having thus described the invention, what is claimed is:

1. A crop harvesting machine movable between a crop harvesting position and a lateral transport position comprising:
   a frame having first and second spaced apart wheels mounted thereon for mobilely supporting said frame on the ground;
   a crop harvesting header mounted on said frame to harvest crop adjacent said ground, said header having harvesting means generally horizontally disposed adjacent the ground when in said harvesting position to engage crop material and initiate the crop harvesting process;
   draft means connected to said frame and adapted for connection to a prime mover to move said header over the ground, said draft means having a hitch base pivotally connected to said frame along a pivot axis and a tongue pivotally connected at one end to said hitch base and adapted at an opposing end for connection to said prime mover, said first wheel being disposed adjacent said hitch base;
   first power means interconnecting said tongue and said hitch base to selectively pivotally move said tongue relative to said hitch base between a forwardly extending operating position to a laterally extending transport position;
   second power means interconnecting said frame and said hitch base to selectively pivotally move said frame relative to said hitch base about said pivot axis to move said machine between said crop harvesting position and said lateral transport position, said header rotating with said frame about said pivot axis such that said harvesting means is generally vertically oriented when in said lateral transport position;
   wheel means mounted on said frame to engage said ground to mobilely support said frame when in said lateral transport position.

2. The crop harvesting machine of claim 1 wherein said first and second power means comprises hydraulic cylinder connectable, respectively, to first and second hydraulic circuits through which fluid may flow under pressure to operatively power said hydraulic cylinder.

3. The crop harvesting machine of claim 2 wherein said pivot axis is inclined to a horizontal plane passing through said hitch base.

4. The crop harvesting machine of claim 3 wherein the rotation of said frame about said pivot axis raises said first wheel off the ground, said second wheel supporting at least a portion of said machine on the ground.

5. The crop harvesting machine of claim 4 wherein said hitch base becomes engaged with the ground as said first wheel is elevated off the ground by the rotation of said frame about said pivot axis.

6. The crop harvesting machine of claim 5 wherein said wheel means includes a tower affixed to said frame and a third wheel rotatably mounted on said tower, said tower extending substantially vertically from said frame when said machine is in said crop harvesting position.

7. The crop harvesting machine of claim 6 wherein said frame is rotated approximately 90 degrees around said pivot axis by second hydraulic cylinder when said machine is moved from said crop harvesting position to said transport position.

8. The crop harvesting machine of claim 7 wherein said second wheel is pivotally mounted to said frame and movable between a harvesting position and a transport position, the harvesting position of said second wheel being oriented generally parallel to said first wheel, the transport position of said second wheel being oriented generally parallel to said third wheel, the orientation of the harvesting position of said second wheel being generally perpendicular to the orientation of the transport position.

9. The crop harvesting machine of claim 8 wherein said second hydraulic cylinder is operable to rotate said frame about said pivot axis sufficiently to raise said second wheel off the ground after said third wheel has engaged the ground, the elevation of said second wheel off the ground facilitating the movement of said second wheel between said harvesting and transport positions, said frame being mobilely supported by both said second and third wheels during transport of said crop harvesting machine in said lateral transport position.

10. The crop harvesting header of claim 9 wherein the movement of said tongue to said laterally extending transport position by said first hydraulic cylinder is operable to raise said hitch base off the ground such that said crop harvesting machine is supported in said lateral transport position by the connection between said tongue and the prime mover and said second and third wheels.

11. The crop harvesting machine of claim 2 or 10 wherein said header is movably mounted on said frame, said crop harvesting machine further comprising at least one header lift cylinder interconnecting said frame and said header to move said header relative to said frame.

12. The crop harvesting header of claim 11 wherein both said second hydraulic cylinder and said header lift cylinder are connected to said second hydraulic circuit which includes a selector valve for selectively directing the flow of fluid through said second conduit to one of said second hydraulic cylinder and said header lift cylinder.

13. The crop harvesting machine of claim 12 wherein said selector valve includes a valve spool movable between a first position and a second position and is mounted on said tongue, said valve spool being engageable with a cam to effect movement of said valve spool from said first position to said second position when said tongue is moved to a preselected position, said first position of said valve spool being operable to direct fluid to said header lift cylinder, said second position of said valve spool being operable to direct fluid to said second hydraulic cylinder.

14. The crop harvesting machine of claim 13 wherein said hitch base includes a skid plate for engaging the ground while said crop harvesting machine is moving from said crop harvesting position to said lateral transport position.

15. The crop harvesting machine of claim 14 wherein said pivot axis is defined by a pair of aligned pivot pins.

16. The crop harvesting machine of claim 11 further comprising a pair of windrow shields pivotally mounted on said frame, said windrow shields being pivotally movable between a generally horizontally extending operative position and a generally vertically extending transport position.

17. A method of converting a crop harvesting machine from a longitudinally movable crop harvesting position to a laterally movable transport position comprising:

pivotally rotating the frame of said crop harvesting machine about a pivot axis until a crop harvesting header mounted on said frame moves from a generally horizontally extending position to a generally vertically extending position and a laterally oriented transport wheel engages the ground;

turning one of a pair of longitudinally oriented wheels to a laterally oriented position; and pivotally moving a tongue from a longitudinally extending harvesting position to a laterally extending transport position.

18. The method of claim 17 further comprising the step of:

pivoting a windrow forming shield mounted on said frame from a generally horizontally extending operative position to a generally vertically extending transport position.

19. The method of claim 17 or 18 further comprising the step of:

positioning the tongue in an actuating position to effect a shifting of a selector valve to divert fluid from the header lift cylinders to a hydraulic cylinder for rotating said frame about said pivot axis.

20. The method of claim 19 wherein said pivotally moving step and said pivotally rotating step are accomplished by actuating first and second hydraulic cylinders, respectively.

* * * * *